(12) United States Patent
Goodwin, III et al.

(10) Patent No.: US 11,741,448 B2
(45) Date of Patent: Aug. 29, 2023

(54) TOUCHLESS TRANSACTION TERMINAL PROCESSING

(71) Applicant: NCR Corporation, Atlanta, GA (US)

(72) Inventors: John Coker Goodwin, III, Suwanee, GA (US); Rick Royce Fender, Lawrenceville, GA (US); Robert Ridwan Susanto, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/861,070

(22) Filed: Apr. 28, 2020

(65) Prior Publication Data

US 2021/0334779 A1    Oct. 28, 2021

(51) Int. Cl.
*G06Q 20/20*    (2012.01)
*G06Q 20/32*    (2012.01)
*G06K 7/14*    (2006.01)
*G06Q 20/10*    (2012.01)

(52) U.S. Cl.
CPC ......... *G06Q 20/204* (2013.01); *G06K 7/1417* (2013.01); *G06Q 20/1085* (2013.01); *G06Q 20/209* (2013.01); *G06Q 20/3224* (2013.01); *G06Q 20/3274* (2013.01); *G06Q 20/3276* (2013.01)

(58) Field of Classification Search
CPC ............. G06Q 20/352; G06Q 20/3278; G06Q 20/4014; G06Q 20/20; G06Q 20/204; G06Q 20/18; G06Q 20/209; G06Q 20/3276; G06Q 20/1085; G06Q 20/3274; G06F 3/0482; G06F 3/0488; G07F 19/00; G06K 7/1417
See application file for complete search history.

(56) References Cited

U.S. PATENT DOCUMENTS

| | | | |
|---|---|---|---|
| 8,539,375 B1* | 9/2013 | Thorsander | G06F 3/0482 345/173 |
| 9,092,776 B2* | 7/2015 | Dessert | G06Q 20/3276 |
| 9,576,285 B2* | 2/2017 | Zhou | G06Q 20/3274 |
| 10,304,057 B1* | 5/2019 | Powell | G06Q 20/322 |
| 10,706,400 B1* | 7/2020 | Puffer | G06Q 20/38215 |
| 2012/0284130 A1* | 11/2012 | Lewis | G06Q 40/00 705/16 |
| 2012/0296726 A1* | 11/2012 | Dessert | G06Q 30/0268 705/14.27 |
| 2013/0232017 A1* | 9/2013 | Nathan | G06Q 20/29 705/16 |
| 2017/0161728 A1* | 6/2017 | Satyanarayan | G06Q 20/401 |
| 2020/0090151 A1* | 3/2020 | Francis | G06Q 20/3224 |
| 2021/0272097 A1* | 9/2021 | Wen | H04L 9/3271 |

* cited by examiner

*Primary Examiner* — Florian M Zeender
*Assistant Examiner* — Milena Racic
(74) *Attorney, Agent, or Firm* — Schwegman Lundberg & Woessner, P.A.

(57) ABSTRACT

A touchless payment option is received for a transaction being processed at a transaction terminal. A payment option for a transaction interface on the transaction terminal is deactivated. A registered payment method is obtained for a customer associated with the transaction and the registered payment method is processed with a payment server to obtain payment for the transaction. Transaction screens associated with the transaction are automatically updated to reflect that payment was received by the transaction terminal. The customer does not touch any surface of touch display to initiate or to perform payment processing at the transaction terminal.

20 Claims, 4 Drawing Sheets

TOUCHLESS TRANSACTION TERMINAL PROCESSING

BACKGROUND

Touch-based displays are prevalent in the retail industry. Transaction terminals can be operated by attendants on behalf of customers for cashier-assisted checkouts or can be self-operated by the customers for self-checkouts.

However, the touch-surfaces of the displays often harbor bacteria and viruses. Bacteria and viruses can live on the touch-surfaces for hours if not days. Moreover, the surfaces are touched in the exact same display locations repeatedly by different people throughout the business hours of a store. Transaction interfaces, which are presented within screens on the displays will render touchable options in a consistent and a same location, which ensures that different people operating the terminals for checkouts during business hours are all touching a potentially hazardous surface.

Furthermore, the terminal displays are typically located at eye level of an average consumer, such that the touch surfaces are often sprayed with bacteria and viruses throughout the day by attendants or customers that cough or sneeze during checkouts.

Given what is transpiring in the world with the COVID-19 virus, retailers are rightly concerned about the health and safety of their customers and their employees, who are repeatedly touching a same touch surface of a display throughout the day.

In view of COVID-19, most stores have shut down operations for at least a few hours a day to disinfect all store surfaces, which presumably includes disinfecting touch surfaces of the transaction displays. But, disinfecting each touchscreen display after each customer operates a single terminal is unrealistic and unachievable during business hours especially when grocery stores are extraordinarily busy during the pandemic; therefore, checkout processing at stores remains a substantial health and safety concern in the industry.

Additionally, grocery stores are unable to completely shut down for business because people have to have food to survive and grocery stores are essential services. No country has the ability to acquire and distribute food to all their citizens in their homes, which would require an unfathomable amount of planning, distribution resources, and human resources. Consequently, grocery stores must remain open and especially so during a pandemic.

SUMMARY

In various embodiments, methods and a system for touchless transaction terminal processing are presented.

According to an aspect, a method for touchless transaction terminal processing is presented. A customer identifier for a customer is linked to a transaction being performed at a transaction terminal without the customer touching options associated with a transaction interface of the transaction terminal during the transaction. A payment for the transaction is processed based on a payment method linked to the customer identifier without the customer touching the options. Finally, a payment notification is caused to be received by the transaction terminal indicating that the payment was received for the transaction.

DETAILED DESCRIPTION

Figure 1:
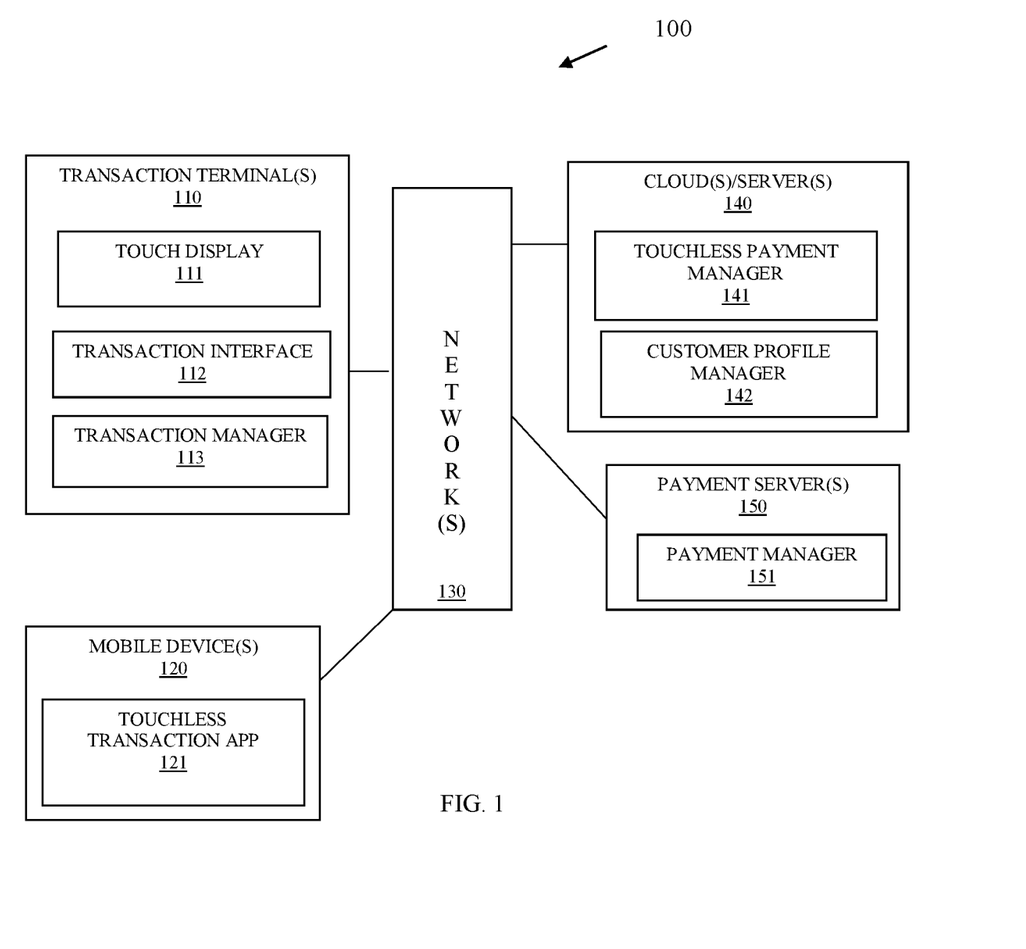
FIG. 1 is a diagram of a system for touchless transaction terminal processing, according to an example embodiment.

FIG. 1 is a diagram of a system 100 for touchless transaction terminal processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of touchless operation of a transaction terminal for checkouts presented herein and below.

The system 100 provides a mechanism by which transaction interfaces can be operated and transaction payment can be processed without touching interface options that are rendered on touchscreen display surfaces of the transaction terminals. The mechanism is achieved with minimal changes to existing and legacy transaction interfaces of the transaction terminals. System 100 substantially decreases or eliminates the risk of exposure to bacteria and viruses by attendants/cashiers and customers during checkouts at the transaction terminals by reducing or eliminating touches on potentially contaminated surfaces (such touches would conventionally be required without the teachings provided herein).

The system 100 includes: transaction terminals 110, mobile devices 120, a variety of network connections 130, one or more cloud processing environments (clouds) or servers 140, and one or more payment processing servers 150.

Each transaction terminal 110 includes a touch display 111, a processor, and a non-transitory computer-readable storage medium having executable instructions representing a transaction interface 112 and a transaction manager 113. The executable instructions when executed by the corresponding processor of the corresponding terminal 110 from the corresponding non-transitory computer-readable storage medium cause the corresponding processor to perform processing discussed below herein and below as transaction interface 112 and transaction manager 113.

It is noted that each terminal 110 may include a variety of other peripheral devices, such as a scanner, a weigh scale, a combined scanner-weigh scale, a currency and/or coin accepter, a currency and/or coin dispenser, a camera, a contact-based card reader, a contactless card reader, and a receipt printer. Only touch display 111 peripheral device of terminal 110 is necessary for understanding and comprehending the beneficial safety teachings that follow.

Each mobile device 120 is operated by a customer who is performing a checkout at terminal 110. Each mobile device 120 includes a camera (not shown in FIG. 1), a processor, and a non-transitory computer-readable storage medium comprising executable instructions representing a touchless transaction application (app) 121. The touchless transaction app 121 when executed by corresponding processor of the corresponding mobile device 120 from the corresponding non-transitory computer-readable storage medium causes the corresponding processor to perform processing discussed herein and below with respect to the touchless transaction app 121.

Each cloud/server 140 includes at least one processor and a non-transitory computer-readable storage medium having executable instructions representing a touchless payment manager 141 and a customer profile manager 142. The corresponding executable instructions when executed by the corresponding processor from the corresponding non-transitory computer-readable storage medium cause the corresponding processor to perform processing discussed herein and below as touchless payment manager 141 and customer profile manager 142.

Each payment server 150 includes at least one processor and a non-transitory computer-readable storage medium having executable instructions representing a payment manager 151. The corresponding executable instructions when executed by the corresponding processor from the corresponding non-transitory computer-readable storage medium cause the corresponding processor to perform processing discussed herein and below as payment manager 151.

Initially, customers download, register, and initiate touchless transaction apps 121 on their mobile devices 120. During registration, customer payment methods or payment cards are registered by customer profile manager 142.

Once touchless transaction app 121 is downloaded and registered to a customer, the operation of system 100 proceeds as follows for a touchless transaction associated with a checkout at a store.

Transaction manager 113 renders an initial transaction screen for a transaction on touch display 111 of terminal 110. There are a few embodiments that can be processed when the customer approaches the terminal for the transaction. In a first embodiment, transaction manager 113 causes a code (such as a Quick Response (QR) or code that is read through Optical Character Recognition (OCR), 1 dimensional barcode, etc.) to be rendered on the initial splash screen or all transaction screens of transaction interface 112. The code is encoded to indicate that the customer desires to proceed with the transaction utilizing touchless payment. In a second embodiment, touchless transaction app 121 when activated by the customer renders a code (such as a QR code or code that is read through an OCR process) on a touchscreen display of mobile device 120, the customer places the mobile display with the presented QR code in front of the scanner of terminal 110 to be read by transaction manager 113. The code read by transaction manager 113 from the mobile display is encoded with customer identification information and an indication that the customer desires to proceed with touchless payment processing for the transaction.

In the first embodiment of system 100 (transaction manager 113 renders the code on the splash screen), the customer opens touchless transaction app 121 and selects an option to proceed with the touchless transaction payment processing for the transaction. Touchless transaction app 121 accesses the integrated camera of mobile device 120 and waits until a code is read. The customer centers the code presented on the splash screen of touch display 111 by transaction manager 113 within the lines rendered on the mobile display for reading the code. Touchless transaction app 121 obtains the image of the code, decodes the code and obtains unique identifiers for the transaction and transaction terminal 110. Touchless transaction app 121 adds a mobile device or customer identifier to the transaction identifier and the transaction terminal identifier and sends the identifiers over a wireless network connection 130 to touchless payment manager 141. Touchless payment manager 141 obtains the customer's payment method (payment card details or payment service details registered to the customer) from customer profile manager 142 using customer identifier. Touchless payment manager 141 then sends an event or an instruction to transaction manager 113 using a different network connection 130 (which may be wired, wireless, or a combination of both wired and wireless).

The instruction or event is an indication to transaction manager 113 that payment processing for the initiated transaction with the customer is to be a touchless payment. The event may also be received by transaction manager 113 as an indication that the transaction is to be completed with touchless payment processing as soon as the event or instruction is received. Transaction manager 113 allows the customer/attendant to scan items being purchased at terminal 110 to be passed over or within the field of view of the scanner for terminal 110 and item codes are processed for item descriptions and item processing by transaction manager 113. Transaction manager 113 updates transaction details within transaction screens rendered on touch display 111 through transaction interface 112 (each transaction screen including the generated code by transaction manager 113).

Typically, each updated transaction screen would include a touchable option associated with transaction interface 112 that would allow the customer to conclude the transaction and process payment; this conventional touchable option would conventionally require a touch input on the location of the touch display surface by the customer to move the state of the transaction into a payment mode of processing. Transaction manager 113 may, in some instance, grey out the convention touchable option or the existing payment option, such that it is non-selectable by the customer. The customer does not have to touch the option to cause payment processing to be initiated.

Transaction manager 113 may assume that the transaction is ready for payment in a variety of manners, such as soon as transaction manager 113 receives the event or the instruction from touchless payment manager 141 (as discussed above). Alternatively, transaction manager may receive the event from touchless payment manager 141 at any time during the transaction (before a first item is scanned or while items are being scanned). If the event or instruction is received before start of the transaction or while items are still being scanned, then transaction manager 113 may assume that touchless payment processing is to be performed after a preconfigured period of time during which no additional item is presented to the scanner for the transaction. In another case when the event is received before start of the transaction or while items are being scanned for the transaction, touchless transaction app 121 may present the payment option on the mobile display of mobile device 120 for the customer to select, which causes the payment event to be sent to touchless payment manager 141 and relayed by touchless payment manager 141 to transaction manager 113. In still another case, both the elapsed period of configurable time without activity and the mobile device-initiated payment option selection can both be used by transaction manager 113 to determine that touchless payment processing is to be initiated for the transaction when the event or instruction provided by touchless payment manager 141 is not considered to be an end to item scanning and touchless payment processing. In an embodiment, the configurable elapsed period of no activity can be customer defined within the customer's profile (here the configurable elapsed period of time is provided to transaction manager 113 by touchless payment manager 141 when the customer's profile (obtained from customer profile manager 142) includes such a customer-defined setting)).

Once transaction manager 113 has determined that there are no additional items to process for the transaction, transaction manager 113 sends a notice to touchless payment manager 141 along with the transaction details and transaction price. Touchless payment manager 141 sends the registered payment method and transaction details to a payment server 150 associated with the registered payment method. Payment manager 151 processes the payment using the registered payment method and sends a confirmation back to either transaction manager 113 or touchless payment manager 141 (which then notifies transaction manager 113). In another case, the registered payment method for the customer is provided by touchless payment manager 141 to transaction manager 113 when the event is sent to indicate that the transaction is to be processed with touchless payment processing and transaction manager 113 sends the transaction details and registered payment method directly to payment manager 151 over network connection 130 (wired, wireless, or a combination of both wired and wireless).

Transaction manager 113 receives a confirmation that the payment was processed and immediately updates transaction screens rendered on touch display 111 with a confirmation that payment was received. Touchless payment manager 141 may then send the transaction details and payment confirmation as a receipt to touchless transaction app 121 or via any registered or preferred receipt delivery method included in the customer's profile, such as via email, via a text message, and/or via in-app messages to touchless transaction app 121.

In the first embodiment of system 100, it is clear that the customer need not make any touches on touch display or within transaction interface 112 to perform touchless payment processing for the customer's transaction. This provides enhanced health safety by eliminating touches on a potentially contaminated touch display surface.

In a second embodiment of system 100 (the code for touchless payment is generated by touchless transaction app 121, displayed on mobile display of mobile device 120 read by a scanner or camera of transaction terminal 110), touchless transaction app 121 generates the code with an identifier of the customer associated with the registered mobile device 120 and/or app 121. A scanner or camera of terminal 110 captures the code and transaction manager 113 decodes the code to obtain the customer identifier for the customer. The terminal identifier and a transaction identifier for the transaction sent by transaction manager 113 along with the customer identifier to touchless payment manager 141. Touchless payment manager 141, transaction manager 113, and touchless transaction app 121 then operate in a same or similar manner as was described in the first embodiment of system 100 to perform touchless payment processing for the transaction of the customer. However, transaction manager 113 may infer from decoding the code that touchless payment processing is desired, such that unlike the first embodiment, touchless payment manager 141 does not need to send an event or an instruction back to transaction manager 113 for transaction manager 113 to deactivate and grey out the payment option from screens associated with transaction interface 113.

In an embodiment, touchless payment manager 141 tracks the physical location of mobile device 120 through reported location information provided by touchless transaction app 121 utilizing native location services of mobile device 120. Touchless payment manager 141 also maintains specific location information for terminals 110. When touchless payment manager 141 determines that mobile device 120 is within a configured distance of a few feet (1 to 3 feet) of terminal 110, an in-app message or a text message may be sent to touchless transaction app 121 or device 120 asking that the customer confirm that touchless payment processing is desired for a transaction with terminal 110. The customer can either select an touchless payment option within a user-facing interface of touchless transaction app 121 or reply to any text message with a confirmation word, such as YES, and touchless payment manager 141 initiates the touchless payment processing described above for the second embodiment without any code generation being required by touchless transaction app 121.

In an embodiment, a wireless beacon of terminal 110 may transmit over a low energy signal transmission a terminal identifier for terminal 110 and a transaction identifier for a next transaction. A wireless transceiver of mobile device 120 detects the signal having the identifiers indicating that mobile device 120 is at terminal 110 due to touchless transaction app's ability to receive the signal. The signal (with the identifiers) is then forwarded by touchless transaction app 121 to touchless payment manager 141 and touchless payment processing is performed in the manner discussed above with the first embodiment without any code generation or interface screen being modified by transaction manager 113.

In some cases for the first embodiment of system 100, the code rendered on splash screen by transaction manager 113 may remain on all updated transaction screens generated by transaction manager 113 for the transaction interface 112 as items are scanned for the transaction, such that the customer may utilize touchless transaction app at any point for which the customer desires to conclude and perform touchless payment processing.

Similarly, and in some cases for the second embodiment of system 100, the code rendered on the mobile device display by touchless transaction app 121 may be scanned by a scanner or a camera of transaction terminal 110 at any time that the customer desires to conclude the transaction and proceed with touchless payment processing.

In an embodiment, touch display 111 is operated by an attendant/cashier on behalf of the customer during checkout. In this embodiment, transaction terminal 110 is a Point-Of-Sale (POS) terminal. Moreover, and in this embodiment, terminal 110 may include a separate customer display that faces the customer where the transaction screens and any transaction manager 113 generated touchless payment code is presented for capturing by mobile device 120 and decoding by touchless transaction app 121. Furthermore, and in this embodiment, an indication by the cashier into transaction interface 113 may cause transaction manager 113 to generate the code and present such code at that time on the customer display for capturing.

In an embodiment, transaction manager 113 executes or is provided from server/cloud 140.

In an embodiment, transaction interface 114 executes or is provided from server/cloud 140.

In an embodiment, transaction interface 114 is provided through a web browser as web-based pages rendered within a browser from terminal 110.

In an embodiment, terminal 110 is a Self-Service Terminal (SST) that is operated by the customer for a self-checkout.

In an embodiment, mobile device 120 is a mobile phone, a tablet computer, a laptop computer, or a wearable processing device worn by the customer.

System 100 achieves touchless payment processing at terminal 110 through interaction between terminal 110, mobile device 120, server 140, and server 150 over multiple different network connections 130. This can be achieved using code generation and processing as discussed in the first and second embodiments, in a third embodiment utilizing location information, or in a fourth embodiment utilizing beacon signal transmissions as discussed above. Moreover, minimal changes are needed to existing software and interfaces to perform the processing of system 100.

The above-noted embodiments and other embodiments are now discussed with reference to FIGS. 2-4.

Figure 2:
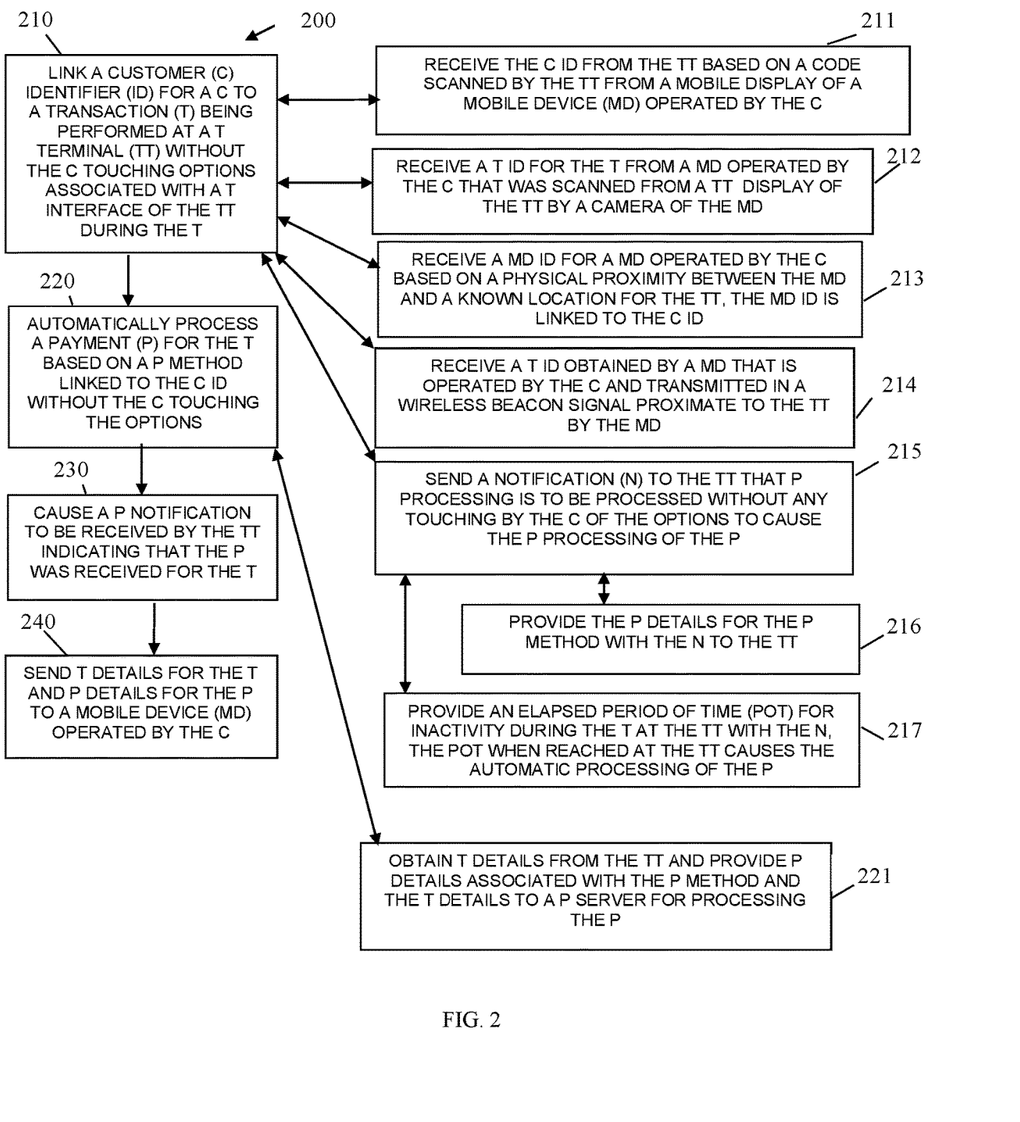
FIG. 2 is a diagram of a method for touchless transaction terminal processing, according to an example embodiment.

FIG. 2 is a diagram of a method 200 for touchless transaction terminal processing, according to an example embodiment. The software module(s) that implements the method 200 is referred to as a "touchless payment manager." The touchless payment manager is implemented as executable instructions programmed and residing within memory and/or a non-transitory computer-readable (processor-readable) storage medium and executed by one or more processors of a device. The processor(s) of the device that executes the touchless payment manager are specifically configured and programmed to process the touchless payment manager. The touchless payment manager has access to one or more network connections during its processing. The network connections can be wired, wireless, or a combination of wired and wireless.

In an embodiment, the device that executes the touchless payment manager is cloud(s)/server(s) 140. In an embodiment, the device that executes the touchless payment manager is one or more cloud processing environments 140. In an embodiment, the device that executes the touchless payment manager is one or more servers 140.

In an embodiment, the touchless payment manager is all of or some combination of 141 and/or 142.

At 210, the touchless payment manager links a customer identifier for a customer to a transaction being performed at a transaction terminal without the customer touching options associated with a transaction interface of the transaction terminal during the transaction. That is, the customer is linked to the transaction without touching any touchscreen display surface or any input key. This linking can occur in any of the four embodiments discussed above with system 100 of FIG. 1.

For example, at 211, the touchless payment manager receives the customer identifier from the transaction terminal based on a code scanned by the transaction terminal from a mobile device display of a mobile device operated by the customer while at the transaction terminal. This was the first embodiment discussed above with system 100 of FIG. 1.

In another case, at 212, the touchless payment manager receives a transaction identifier for the transaction and/or a transaction terminal identifier for the transaction terminal from a mobile device operated by the customer. The transaction identifier or transaction terminal identifier is provided from the mobile device, and the mobile device captures or scans a QR code that is encoded with the transaction/transaction terminal identifier from a display of the transaction terminal using a camera integrated into the mobile device. The entire QR code may be provided by the mobile device or the mobile device may decode the QR code and provide just the transaction/transaction terminal identifier to the touchless payment manager. The mobile device also sends a mobile device identifier for the mobile device, which is registered to the customer identifier of the customer. This was the second embodiment discussed with system 100 of FIG. 1.

In still another case, at 213, the touchless payment manager receives a mobile device identifier for a mobile device operated by the customer based on a physical proximity between the mobile device and a known location for the transaction terminal. Again, the mobile device identifier is linked to the customer identifier. This was discussed with the third embodiment of system 100 of FIG. 1.

In another situation, at 214, the touchless payment manager receives a transaction/transaction terminal identifier obtained by a mobile device operated by the customer and transmitted in a wireless beacon signal that is proximate to the transaction terminal. The mobile device captures the signal when it is in close proximity (1-3 feet) of the transaction terminal and adds the mobile device identifier and sends the signal and mobile device identifier to the touchless payment manager. This was discussed in the fourth embodiment of system 100 of FIG. 1.

In an embodiment, at 215, the touchless payment manager sends a notification to the transaction terminal that payment processing is to be processed without any touching by the customer of the options for the transaction terminal to cause automatic payment processing for the transaction.

In an embodiment of 215 and at 216, the touchless payment manager provides payment details for the registered payment method (linked to the customer identifier of the customer) with the notification to the transaction terminal.

In an embodiment of 215 and at 217, the touchless payment manager provides an elapsed period of time for inactivity during the transaction at the transaction terminal along with the notification to the transaction terminal. This is a customer-profile defined period of inactivity for which the transaction terminal uses to determine when payment processing is to be initiated for the transaction.

At 220, the touchless payment manager automatically processes a payment for the transaction based on the payment method linked to the customer identifier. This is done without the customer touching the options presented on the transaction display of the transaction terminal.

In an embodiment, at 221, the touchless payment manager obtains transaction details for the transaction and provides payment details associated with the registered payment method and the transaction details to a payment server for processing the payment needed for the transaction.

At 230, the touchless payment manager causes a payment notification to be received by the transaction terminal. The notification indicating that the payment was received for the customer transaction. Here, either the transaction terminal or the touchless payment manager contacts the payment server for payment processing, and the notification can be provided from the payment server directly back to the transaction terminal or can be provided by the touchless payment manager after the payment server confirms the payment successfully completed.

In an embodiment, at 240, the touchless payment manager sends transaction details for the transaction and payment details for the payment to a mobile device operated by the customer. The transaction and payment details comprise an electronic receipt that is delivered to the mobile device in any number of manners, some of which may be defined in a customer profile associated with the customer identifier, such as email, SMS text message, and/or an in-app message.

Figure 3:
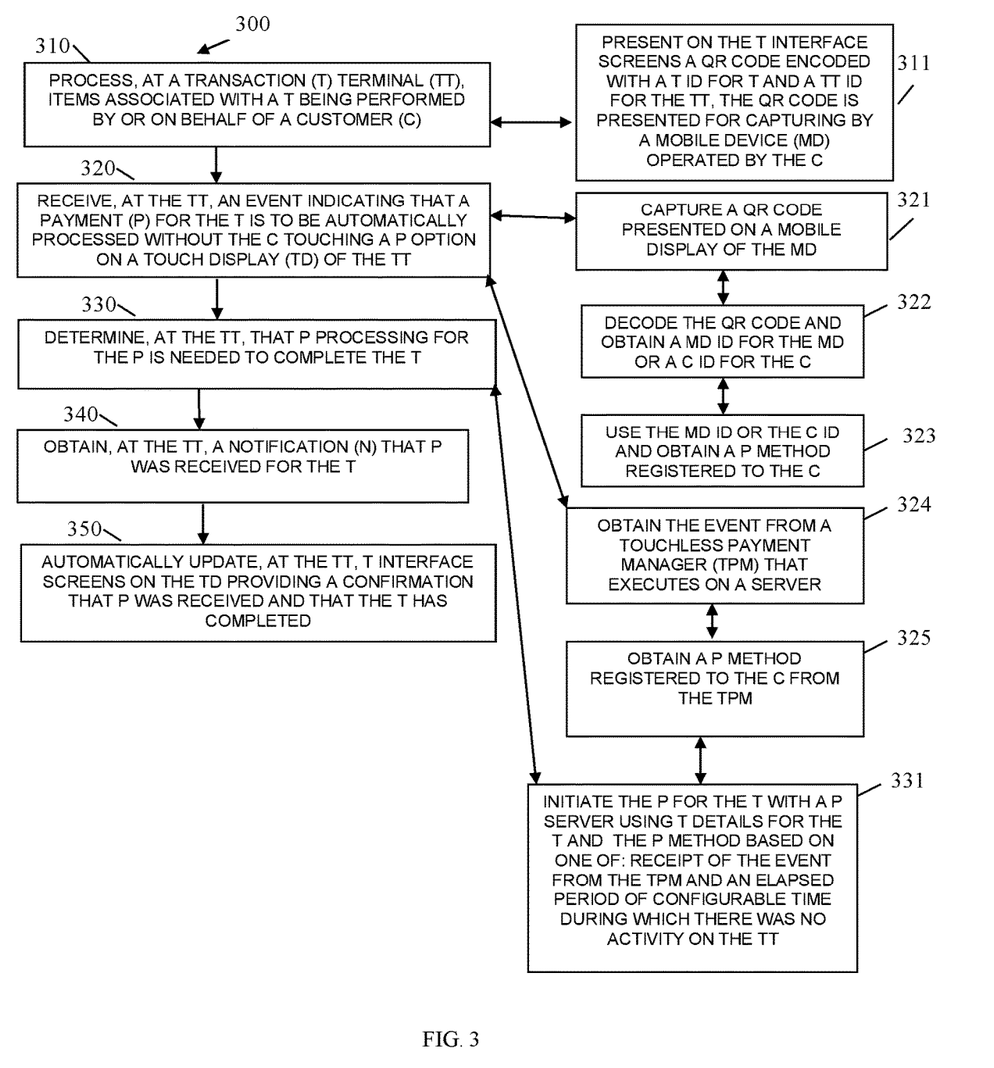
FIG. 3 is a diagram of another method for touchless transaction terminal processing, according to an example embodiment.

FIG. 3 is a diagram of another method 300 for touchless transaction terminal processing, according to an example embodiment. The software module(s) that implements the method 300 is referred to as a "touchless transaction manager." The touchless transaction manager is implemented as executable instructions programmed and residing within memory and/or a non-transitory computer-readable (processor-readable) storage medium and executed by one or more processors of a device. The processors that execute the touchless transaction manager are specifically configured and programmed to process the touchless transaction manager. The touchless transaction manager has access to one or more network connections during its processing. The network connections can be wired, wireless, or a combination of wired and wireless.

In an embodiment, the device that executes the touchless transaction manager is transaction terminal 110. In an embodiment, transaction terminal 110 is: a POS terminal, a SST, an ATM, or a kiosk.

In an embodiment, the touchless transaction manager is all or some combination of 112 and/or 113.

The touchless transaction manager presents the interaction between terminal 110, cloud/server 140, and/or method 200.

At 310, the touchless transaction manager processes items associated with a transaction being performed by the customer (transaction terminal is an SST) or being performed on behalf of the customer (transaction terminal is a POS terminal).

In an embodiment, at 311, the touchless transaction manager presents on transaction interface screens a QR code encoded with a transaction identifier for the transaction and a transaction terminal identifier for the transaction terminal. The QR code is presented for capturing by a camera integrated into a mobile device operated by the customer.

At 320, the touchless transaction manager receives an event that a payment for the transaction is to be automatically processed without the customer touching a payment option on a touch display of the transaction terminal.

In an embodiment, at 321, the touchless transaction manager captures a QR code presented on a mobile display of the mobile device.

In an embodiment of 321 and at 322, the touchless transaction manager decodes the QR code and obtains a mobile device identifier for the mobile device or a customer identifier for the customer.

In an embodiment of 322 and at 323, the touchless transaction manager uses the mobile device identifier or the customer identifier and obtains a payment method registered to the customer.

In an embodiment, at 324, the touchless transaction manager obtains the event from a touchless payment manager 141 that executes on a cloud/server 140.

In an embodiment of 324 and at 325, the touchless transaction manager obtains a payment method registered to the customer from the touchless payment manager.

At 330, the touchless transaction manager determines that payment processing for the payment is needed to complete the transaction at the transaction terminal.

In an embodiment of 325 and 330, at 331, the touchless transaction manager initiates payment processing for the transaction with a payment server using transaction details for the transaction and payment details associated with the payment method based on one of: receipt of the event at 324 from the touchless payment manager 141 and an elapsed period of configurable time during which there was no activity for item processing of the items on the transaction terminal.

At 340, the touchless transaction manager obtains a notification that payment was received for the transaction. The notification can come directly from a payment server 150 or come from touchless payment manager 141.

At 350, the touchless transaction manager automatically updates transaction interface screens on the transaction terminal display providing a confirmation that payment was received and that the transaction has completed.

Figure 4:
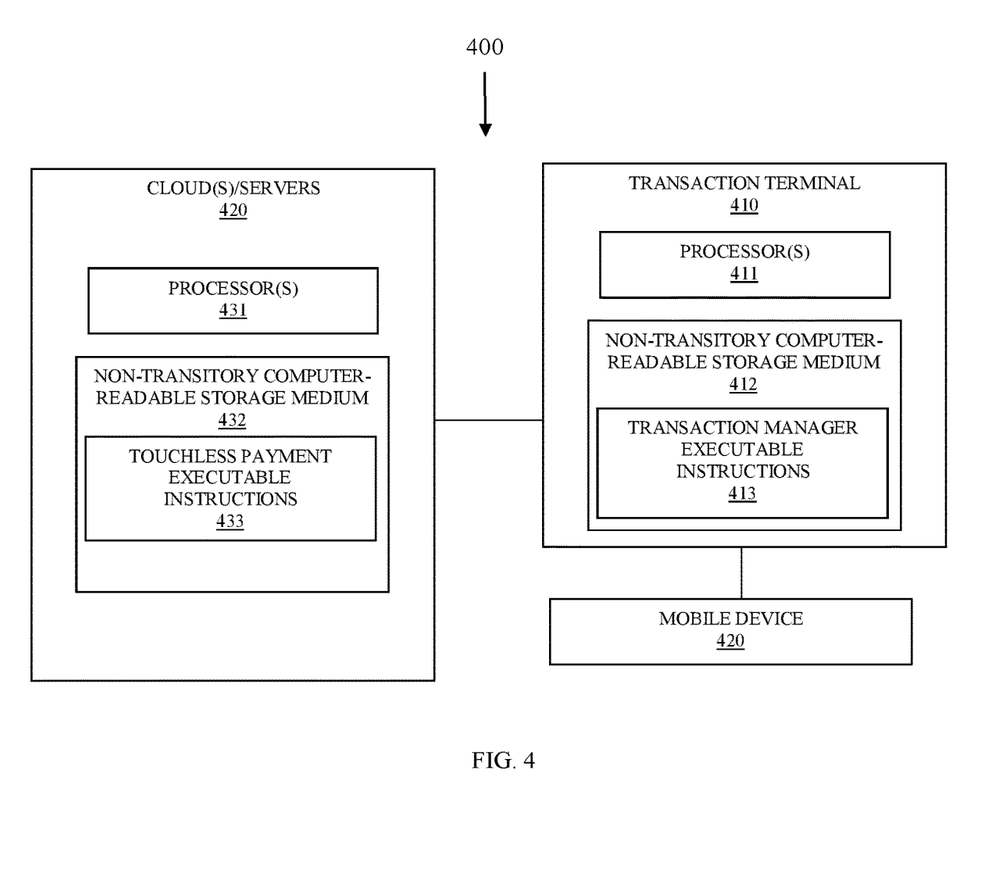
FIG. 4 is a diagram of another system for touchless transaction terminal processing, according to an example embodiment.

FIG. 4 is a diagram of another system 400 for touchless transaction terminal processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a transaction terminal 410 having at least one processor 411 and a non-transitory computer-readable storage medium 412 comprising transaction manager executable instructions 413. The system 400 further includes a mobile device 420. Moreover, the system 400 includes one or more clouds or servers 430 having at least one processor 431 and a non-transitory computer-readable storage medium 432 comprising touchless payment executable instructions 433.

In an embodiment, the transaction manager executable instructions 413 are all of or some combination of 112, 113, and/or the method 300.

In an embodiment, the touchless payment executable instructions 433 are all of or some combination of 141, 142, and/or the method 200.

In an embodiment, mobile device 420 includes touchless transaction app 121 and the processing described above with respect to mobile device 120.

In an embodiment, transaction terminal 410 is a POS terminal, a SST, a kiosk, or an ATM.

In an embodiment, mobile device 420 is a mobile device, a tablet computer, a laptop computer, or a wearable processing device.

The transaction manager set of executable instructions 413 when executed by the transaction processor 411 from the transaction non-transitory computer-readable storage medium 412 cause the transaction processor 413 to perform processing comprising: 1) displaying a QR code on transaction screens presented on a transaction display of the transaction terminal 110; 2) processing item codes for a transaction being conducted by or on behalf of a customer at the transaction terminal 110; 3) receiving an event from the touchless payment manager set of executable instructions 433 indicating that a payment for the transaction was requested; 4) receiving a notification from a payment server that payment was processed for the transaction without the customer having touched a payment option associated with the transaction screens; and 5) updating the transaction screens to confirm the payment and completion of the transaction.

The touchless payment executable instructions 433 when executed by the cloud/server processor 431 from the cloud/server non-transitory computer-readable storage medium 432 causes the cloud/server processor 431 to perform processing comprising: 1) receiving the QR code captured by the mobile device 420 from the transaction screens of the transaction display; 2) receiving a mobile device identifier from the mobile device 120 with the QR code; 3) decoding the QR code and obtaining a transaction terminal identifier for the transaction terminal 110 and a transaction identifier for the transaction; 4) obtaining a customer identifier for the customer based on the mobile device identifier; 5) obtaining a payment method registered to the customer identifier; 6) sending the event to the transaction manager set of executable instructions; and 7) causing the payment method and transaction details for the transaction to be sent to the payment server.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
causing a transaction terminal to display a code on a splash screen of a transaction interface of the transaction terminal and during each subsequent transaction screen of the transaction interface during a transaction at the transaction terminal;
linking a customer identifier for a customer to the transaction being performed at the transaction terminal without the customer touching options associated with the transaction interface of the transaction terminal during the transaction when a mobile device operated by the customer reports the code scanned by the mobile device at a start of the transaction from the splash screen or at any point during the transaction from any of the subsequent transaction screens of the transaction interface;
greying out and disabling each touchable option making each touchable option non-selectable by the customer from each subsequent transaction screen of the transaction interface after the linking causing transaction inputs received from the customer to be accessed by the customer on the mobile device and not the subsequent transaction screens on the transaction terminal;
automatically processing a payment for the transaction based on a payment method linked to the customer identifier without the customer touching the options; and
causing a payment notification to be received by the transaction terminal indicating that the payment was received for the transaction.

2. The method of claim 1 further comprising, sending transaction details for the transaction and the payment to the mobile device operated by the customer.

3. The method of claim 1, wherein linking further includes receiving the customer identifier from the transaction terminal based on a second code scanned by the transaction terminal from a mobile display of the mobile device operated by the customer.

4. The method of claim 1, wherein linking further includes receiving a mobile device identifier for the mobile device operated by the customer based on a physical proximity between the mobile device and a known location for the transaction terminal, wherein the mobile device identifier is linked to the customer identifier.

5. The method of claim 1, wherein linking further includes receiving a transaction identifier obtained by the mobile device that is operated by the customer from the code and transmitted in a wireless beacon signal proximate to the transaction terminal.

6. The method of claim 1, wherein linking further includes receiving a transaction identifier for the transaction from the mobile device operated by the customer that was obtained from the code that was scanned from a transaction terminal display of the transaction terminal by a camera of the mobile device.

7. The method of claim 1, wherein linking further includes sending a notification to the transaction terminal that payment processing is to be processed without any touching by the customer of the options to cause the payment processing of the payment.

8. The method of claim 7, wherein sending further includes providing the payment details for the payment method with the notification to the transaction terminal.

9. The method of claim 7, wherein sending further includes providing an elapsed period of time for inactivity during the transaction at the transaction terminal with the notification, wherein the elapsed period of time when reached at the transaction terminal causes the automatic processing of the payment.

10. The method of claim 1, wherein automatically processing further includes obtaining transaction details from the transaction terminal and providing payment details associated with the payment method and the transaction details to a payment server for processing the payment.

11. A method, comprising:
displaying, by a transaction terminal, a code on a splash screen of a transaction interface of the transaction terminal and during each subsequent transaction screen of the transaction interface during a transaction at the transaction terminal;
processing, by the transaction terminal, items associated with the a transaction being performed by or on behalf of a customer;
receiving, by the transaction terminal, an event indicating that a payment for the transaction is to be automatically processed without the customer touching a payment option on a touch display of the transaction terminal, wherein the event indicates that the code was scanned by a mobile device operated by customer from the splash screen or any of the subsequent transaction screens at any point during the transaction;

greying out and disabling each touchable option presented within the subsequent transaction screens and making each touchable option non-selectable by the customer from each of the subsequent transaction screens of the transaction interface based on the event and causing transaction inputs received from the customer to be accessed by the customer on the mobile device and not the subsequent transaction screens on the transaction terminal;

determining, by the transaction terminal, that payment processing for the payment is needed to complete the transaction;

obtaining, by the transaction terminal, a notification that payment was received for the transaction; and automatically updating, by the transaction terminal, a final transaction screen of the transaction interface screens on the touch display providing a confirmation that payment was received and that the transaction has completed.

12. The method of claim 11, wherein displaying further includes presenting within the splash screen and each of the subsequent screens on the touch display the codes, wherein the code comprises a Quick Response (QR) code that is encoded with a transaction identifier for the transaction and a transaction terminal identifier for the transaction terminal, wherein the QR code is presented for capturing by the mobile device operated by the customer.

13. The method of claim 11, wherein receiving further includes capturing a Quick Response (QR) code presented on a mobile display of a mobile device operated by the customer and linking a customer identifier for the customer to the transaction.

14. The method of claim 13, wherein capturing further includes decoding the QR code and obtaining a mobile device identifier for the mobile device and linking the mobile device identifier to the customer identifier for the customer.

15. The method of claim 14, wherein decoding further includes using the mobile device identifier or the customer identifier and obtaining a payment method registered to the customer.

16. The method of claim 11, wherein receiving further includes obtaining the event from a touchless payment manager that executes on a server.

17. The method of claim 16, wherein obtaining the event further includes obtaining a payment method registered to the customer from the touchless payment manager.

18. The method of claim 11, wherein determining further includes initiating the payment for the transaction with a payment server using transaction details for the transaction and the payment method based on one of: receipt of the event from the touchless payment manager and an elapsed period of configurable time during which there was no activity on the transaction terminal.

19. A system, comprising:
a transaction terminal comprising a transaction processor and a transaction non-transitory computer-readable storage medium having a transaction manager set of executable instructions;
a mobile device;
a server/cloud comprising a server/cloud processor and a server/cloud non-transitory computer-readable storage medium having touchless payment manager set of executable instructions;

the transaction terminal set of executable instructions when executed by the transaction processor from the transaction non-transitory computer-readable storage medium cause the transaction processor to perform processing comprising:
displaying a Quick Response (QR) code on transaction screens presented on a transaction display of the transaction terminal during a splash screen within a transaction interface of the transaction terminal before a transaction starts on the transaction terminal and during each subsequent transaction screen of the transaction interface during the transaction after the transaction is initiated;
processing item codes for the transaction that is started and that is being conducted by or on behalf of a customer at the transaction terminal;
receiving an event from the touchless payment manager set of executable instructions indicating that a payment for the transaction was requested, wherein the event indicates that the QR code was scanned by a mobile device operated by customer from the splash screen or any of the subsequent transaction screens at any point during the transaction;
greying and disabling out each touchable option presented within the subsequent transaction screens making each touchable option non-selectable by the customer from each of the subsequent transaction screens of the transaction interface based on the event and causing transaction inputs received from the customer to be accessed by the customer on the mobile device and not the subsequent transaction screens on the transaction terminal;
receiving a notification from a payment server that payment was processed for the transaction without the customer having touched a payment option associated with the splash screen or any of subsequent transaction screens; and
updating a final transaction screen to confirm the payment and completion of the transaction;
the touchless payment manager set of executable instructions when executed by the cloud/server processor from the cloud/server non-transitory computer-readable storage medium causes the cloud/server processor to perform processing comprising:
receiving the QR code captured by the mobile device from the transaction screens of the transaction display from the splash screen before the transaction started or from any of the subsequent transaction screens during the transaction;
receiving a mobile device identifier from the mobile device with the QR code;
decoding the QR code and obtaining a transaction terminal identifier for the transaction terminal and a transaction identifier for the transaction;
obtaining a customer identifier for the customer based on the mobile device identifier;
obtaining a payment method registered to the customer identifier;
sending the event to the transaction manager set of executable instructions; and
causing the payment method and transaction details for the transaction to be sent to the payment server.

20. The system of claim 19, wherein the transaction terminal is: a Point-Of-Sale (POS) terminal, a Self-Service Terminal (SST), an Automated Teller Machine (ATM), or a kiosk.

* * * * *